Figure 1:
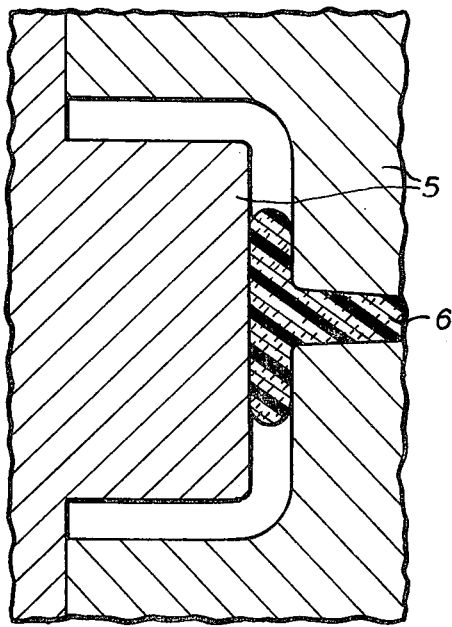

United States Patent [19]

Hanning

[11] 4,014,966
[45] Mar. 29, 1977

[54] METHOD FOR INJECTION MOLDING A COMPOSITE FOAMED BODY HAVING A FOAMED CORE AND A CONTINUOUS SURFACE LAYER

[76] Inventor: Robert Hanning, Cavernago Parc 1, Campione d'Italia, Italy

[22] Filed: Nov. 5, 1974

[21] Appl. No.: 521,184

Related U.S. Application Data

[63] Continuation of Ser. No. 286,733, Sept. 6, 1972, abandoned.

[52] U.S. Cl. .............................. 264/45.1; 264/255; 264/328; 264/DIG. 83; 428/71; 428/315; 428/515
[51] Int. Cl.² ................. B29D 27/00; B29F 1/03
[58] Field of Search .......... 264/DIG. 83, 328, 45.1, 264/46.6, 255; 425/132, 146; 428/71, 315, 515

[56] References Cited

UNITED STATES PATENTS

| | | | |
|---|---|---|---|
| 3,531,553 | 9/1970 | Bodkins | 264/DIG. 83 |
| 3,599,290 | 8/1971 | Garner | 264/DIG. 83 |
| 3,690,797 | 9/1972 | Garner | 425/146 |
| 3,733,156 | 5/1973 | Garner | 425/132 |
| 3,751,534 | 8/1973 | Oxley | 264/DIG. 83 |
| 3,793,410 | 2/1974 | Garner | 264/45.1 |
| 3,801,684 | 4/1974 | Schrewe et al. | 264/328 X |
| 3,809,519 | 5/1974 | Garner | 425/132 X |
| 3,865,915 | 2/1975 | Garner | 264/328 X |
| 3,873,656 | 3/1975 | Garner | 264/46.6 X |
| 3,883,629 | 5/1975 | Garner et al. | 264/328 X |

FOREIGN PATENTS OR APPLICATIONS

| | | | |
|---|---|---|---|
| 1,948,454 | 4/1971 | Germany | 264/DIG. 83 |
| 1,156,217 | 6/1969 | United Kingdom | 264/DIG. 83 |
| 1,333,587 | 10/1973 | United Kingdom | 264/DIG. 83 |

OTHER PUBLICATIONS

Garner, Def. Pub. of Serial No. 202,459, filed Nov. 26, 1971, Published in 904 O.G. 7, on Nov. 7, 1972, Def. Pub. No. T904,007.
Smith, Def. Pub. of Serial No. 348,143, filed Apr. 5, 1973, Published in 922 O.G. 10, on May 7, 1974, Def. Pub. No. T922,007.

*Primary Examiner*—Philip Anderson
*Attorney, Agent, or Firm*—Ernest G. Montague; Karl F. Ross; Herbert Dubno

[57] ABSTRACT

A method of injection molding a body of synthetic resin with a smooth surface and a porous core, which comprises the steps of injecting into a mold first outer synthetic resin forming a smooth surface of the body and thereafter synthetic-resin core material containing an expanding or foaming agent. Only part of the outer material is first injected, the remainder being injected simultaneously with the synthetic-resin core material.

1 Claim, 6 Drawing Figures

METHOD FOR INJECTION MOLDING A COMPOSITE FOAMED BODY HAVING A FOAMED CORE AND A CONTINUOUS SURFACE LAYER

This is a continuation of application Ser. No. 286,733, filed Sept. 6, 1972 and now abandoned.

The present invention relates to a method for injection molding of bodies of synthetic resin material, and, more particularly, to bodies having a smooth surface and a porous core, in which at first the material forming the smooth surface (outer material) and thereafter synthetic resin material containing a foaming or expanding agent (core material) is injected into the mold.

Two different methods of this type are known. In one type a distributing valve coq is arranged in a feeding member to the mold, which is switchable to two different injection-molding machines, of which one delivers synthetic-resin material, free from the foaming agent the other machine delivering the material containing the foaming agent. It is an advantage, of this apparatus that two different materials can be respectively for the periphery and for the core of the body. It is a disadvantage however, that by switching over of the distributing valve coq a stream of the incoming material is torn off and an undesirable admixing of both materials in the distributing valve coq and the feeding tube can occur.

This drawback is avoided in German Auslegeschrift 1 948 454, first published Apr. 1, 1971, by means of an injection nozzle in a feeding member in the material stream, in accordance with a predetermined program a foaming agent is injected. Even this system has the drawback is by this type, that the peripheral zone and the core must consist of the same basic material.

The basic drawback of both known methods is that particularly in the case of bodies with complicated shapes, the outer material injected at first is not uniformly pressed against the wall of the mold by the after-flowing core material; rather the outer material is spread tears, whereby the smooth surface layer is interrupted.

It is one object of the present invention to provide a method in which the advantages of the known methods are retained, but the drawbacks, are avoided. The method of the present invention is characterized by the fact that also complicated bodies can be injection molded, with an edge zone or periphery and core a of different materials, whereby the material for the surface cannot be admixed with the material for the core outside of the mold, and the formation of a continuous smooth edge zone or periphery is ensured.

The method of the present invention is characterized by the fact that at first only one part of the outer material and thereafter the core material and further outer material, are simultaneously injection molded. Thus also during the injection process the outer material continues to surround the core material and during the slow filling of the mold is not only "rolled out" by the core material, but rather maintains a continuous feed.

An apparatus suitable for the performance of the method comprises an injection cylinder, equipped with an injection nozzle and receiving the outer material, an inner piston cylinder receiving the core material is provided as an injection piston, which piston cylinder carries at its forward end a sliding nozzle, the rear end of which, equipped with channels, is displaceable within the piston cylinder containing the core material.

The displacement of the sliding nozzle is effected directly by an inner piston, which is axially movably guided in the piston cylinder and can be subjected to any pressure.

The outer material can be selected at will. It must only have a smooth surface and must combine well with the porous core material. If as outer material, more compact, thus foaming-agent free synthetic material, which can also be colored, is to be used, the injection cylinder is connected with a pre-plasticizer device. By this arrangement the compact synthetic material to be injected can be transformed into a melt most favorable for the injection within the apparatus.

A simplification of the device results by the fact that the inner piston is designed as a worm piston.

In accordance with a further feature of the present invention, the slide nozzle has a tubular-shaped extension, which in injection-molding position passes through the injection nozzle and is advanced to the mold. By this arrangement a safe separation of the outer material from the core material is possible during the injection process.

A presumption for a correct performance of the individual phases of the projection process and thereby for the production of the part of the synthetic material in the desired quality is a corresponding regulating and control device. In order to cover all factors necessary for regulation and control, pressure measuring devices are provided in the injection cylinder as well as in the piston cylinder, which devices are connected with the regulating and control device.

Figure 5:
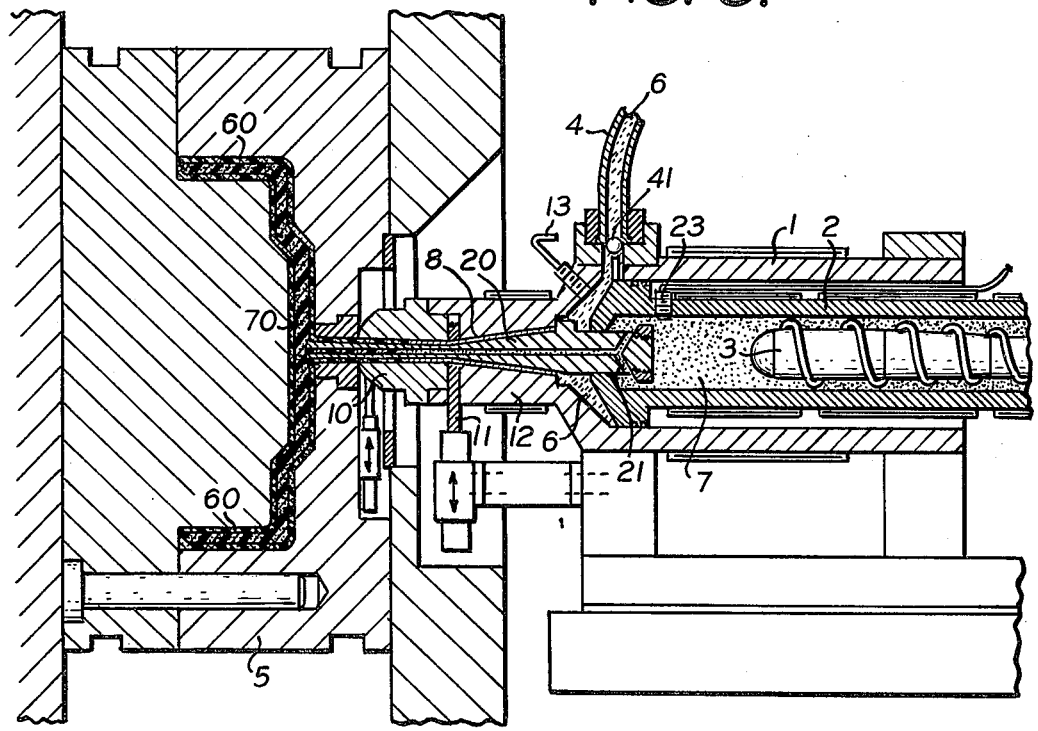
Figure 6:
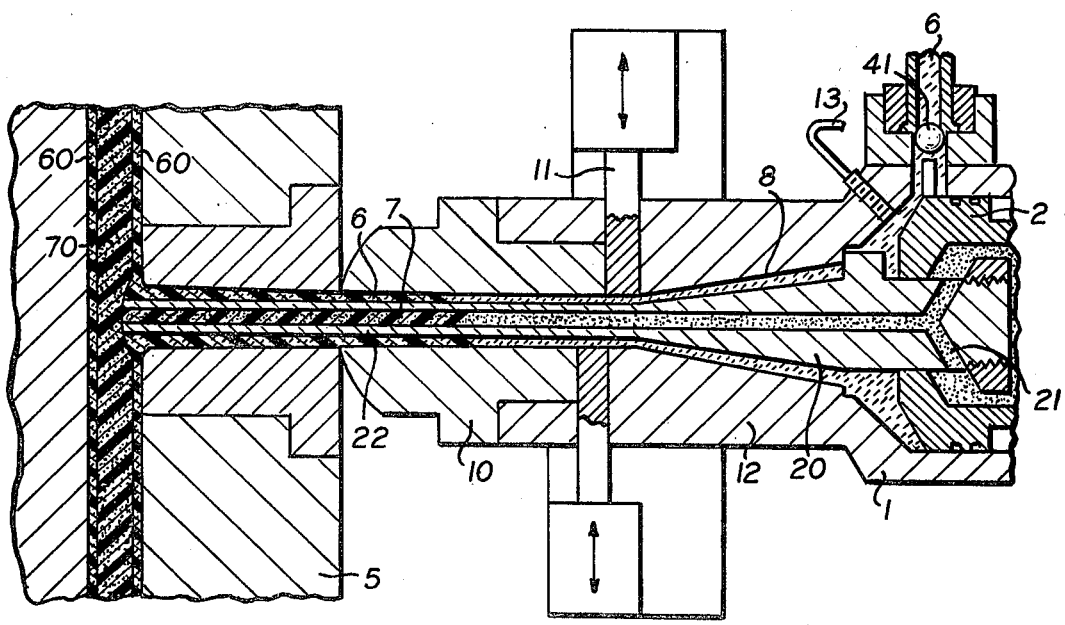

These and other objects will become apparent from the following detailed description, reference being made to the accompanying drawing, in which:

FIGS. 1 to 4 disclose different phases during injection molding in a mold;

FIG. 5 is a fragmentary longitudinal section of the suitable device designed in accordance with the present invention; and FIG. 6 is a longitudinal section drawn to a larger scale of the embodiment with a tubular-shaped extended slide nozzle.

Figure 2:
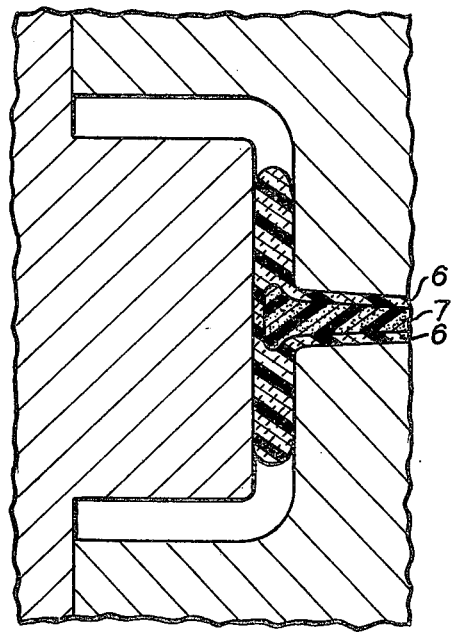
Figure 3:
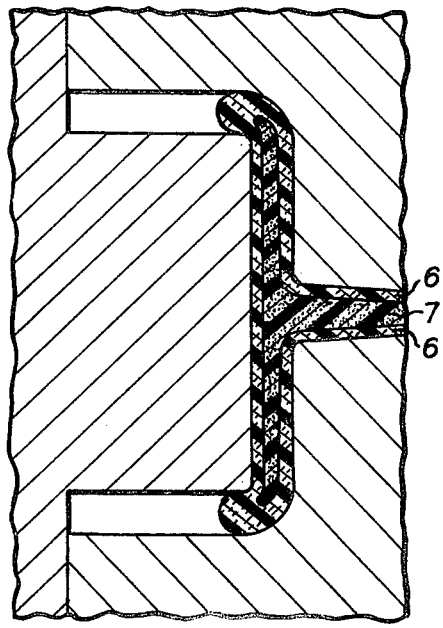
Figure 4:
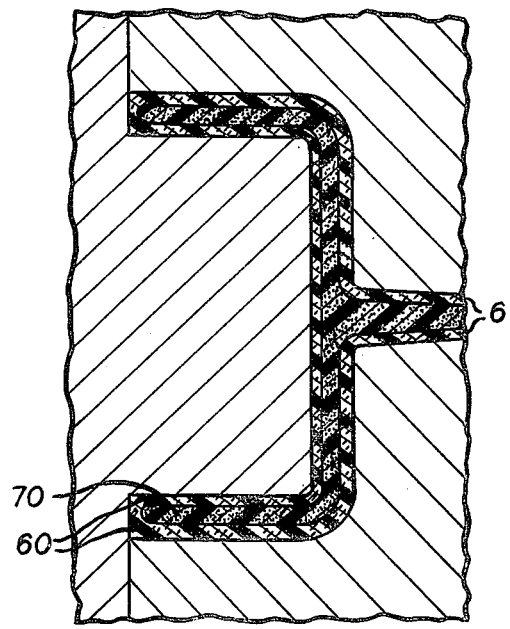

Referring now to the drawings, the method of the present invention is clearly disclosed in FIGS. 1 to 4. In the first method step only one part of the outer material 6 necessary for the formation of the edge zone is injected, which outer material 6 constitutes in the vicinity of the injection opening of the mold 5 a compact mass (FIG. 1). Thereafter simultaneously the outer material 6 and core material 7 are injected. The core material 7 drives apart the compact mass of the already injected outer material 6 and spreads the latter further into the hollow spaced of the mold whereby, because of the simultaneous feeding of further outer material 6, a tearing off of the still soft material is avoided (FIGS. 2 and 3). If the mold is practically filled, as FIG. 4 shows, the feeding of the core material 7 is interrupted and further outer material 6 is after injected, which displaces the core material from the injection opening. After solidifying a continuous smooth peripheral layer 60 and a pore containing core 70 is formed.

In both disclosed embodiments of the apparatus the injection nozzle 10 is connected with the injection cylinder 1, which injection nozzle 10 is mounted in known manner on a frame, which injection nozzle 10 is operable in the shown embodiments hydraulically by a slide 11. In the injection cylinder 1 the piston cylinder 2 is slidably disposed, which can be moved forwardly and backwardly by a drive member, (not shown) by example hydraulically. In the forward end side of the piston cylinder 2 is mounted the sliding nozzle 20, which is conically shaped at its forward end and projects into the head 12 of the injection cylinder, which has a corresponding recess. In the injection cylinder thus a conically shaped slit 8 is formed for the passage of the outer material 6 the strength of which depends upon the position of the slide nozzle 20 in relation to the cylinder head 12. In addition to its center bore, the slide nozzle 20 has radially directed channels 21 at its rear end, which depending upon the position of the sliding nozzle bring about a connection with the inside of the piston cylinder 2 and which free the path of the foaming-agent-containing synthetic material 7 by the sliding nozzle into the mold 5.

In the piston cylinder 2 is guided the inner piston 3, which in the shown embodiments is designed as a worm piston and thus is not only axially movable rather can also be rotated. Not shown is the device known per se for axial - and rotary-movement of the piston 3 and for the feeding of the synthetic material and of the foaming agent.

A conduit 4, through which the outer material 6 reaches the inside of the cylinder 1, is connected to the latter with an intermediate arrangement of a return valve 41 at the forward end of the cylinder 1. The conduit 4 leads to a container (not shown) for the outer material 6 or to a pre-plasticizing device respectively, for a foaming agent-free synthetic material.

For the determination of the pressure in the cylinder chamber in front of the piston cylinder 2, or in front of the piston 3, respectively, in the cylinder 1 or respectively in the piston cylinder 2, the pressure measuring devices 13 and 23, respectively, are arranged which are connected with the regulating-and control-device (not shown).

The operation or the working procedure, is described below, it being assumed, that the surface layer of the part to be produced is a foaming agent free synthetic material.

During the filling process the mass 6 plasticized in the preplasticizing device is pressed through the conduit 4 via the return valve 41 into the inner space of the injection cylinder 1 by example by means of a worm. By the pressure of the mass 6 prevailing in the cylinder chamber, which pressure is adjustable and which can be measured by the measuring device 13, the piston cylinder 2 is moved backwardly (in the drawing to the right). This return sliding, can take place by the pressure of the mass directly or indirectly through a servo device as a consequence of impulses transmitted to the control device. If the piston cylinder 2 is returned so far, that the channels 21 of the sliding nozzle 20 are covered up by the forward end wall of the piston cylinder 2, simultaneously with the piston cylinder 2 also the slide nozzle 20 is withdrawn. Now also the plasticizing of the mass forming the core of the form part, the admixture of the mass with the foaming agent and the filling of the piston cylinder 2 with the foaming agent containing mass 7 can now start by means of a rotary movement of the worm piston 3, which moves axially back with increasing degree of filling (in the drawing towards the right). The pressure of the mass 7 created thereby, which is measurable and settable by the device 23, must stand at a predetermined ratio to the pressure in the injection cylinder 1. During the injection process, the injection nozzle 10 is opened, by example, hydraulically, by means of the slide 11 and the piston cylinder 2 jointly with the piston 3 is displaced forwardly preferably hydraulically or pneumatically. The slide nozzle 20 remains thereby in the position, in which the channels 21 are covered up. Since at the start of the injection, the slide nozzle 20 assumes a position, which is disposed to the right of the position shown in FIG. 1 at first the conically shaped slid 8 and thereby the passage quantity is great. By the later narrowing of the slid the passage quantity is less and thereby the dosing is simplified. If the provided part of the outer mass 6 is injected, the position of the slide nozzle 20 has varied relative to the piston cylinder 2 such, that the channels 21 lie free and thereby the connection between the inside of the piston cylinder 2 and the form 5 or of the injection nozzle 10, is restored. By the axial forward movement of the piston 3 takes place. The injection of the drive means containing mass 7 into the mold 5, while the injection of the outer material 6 in the same manner runs further, however, due to the reduction of the slid 8 in a smaller quantity in the time unit.

The control of the different working steps takes place thereby in dependency upon the time, the path and the set and measured pressures of the masses in the cylinders 1 and 2, whereby these factors individually or jointly can be effective.

The embodiment according to FIG. 2 differs merely by the fact that the slide nozzle 20 at the forward end has a tubular-shaped projection 22. The filling of the injection cylinder 1 and of the piston cylinder 2 with the masses 6 and 7 takes place in the same manner as in the embodiment according to FIG. 1. Also the injection of the mass 6 takes place in the same manner. Before the layer of the material determined for the margin is injected, the tubular extension 22 of the slide nozzle 20 is advanced through the bore of the projection nozzle 10, until it reaches, as an injection needle, through the still soft mass 6 with its forward end or to the inside of the mold 5. By a corresponding setting of the control and regulating members it is as a matter of course also possible to operate with the described device in accordance with the known method, namely at first to inject the total marginal material and thereafter the total core material.

A particular advantage of the apparatus resides in the fact, that during injection of the foaming agent containing mass 7 now degasifying occurs, because this mass is surrounded continuously by the marginal material. The outer marginal layer from the mass 6 operates as sealing and prevents thus the escape of the gases or of the drive means, respectively.

I claim:

1. A method of making a composite synthetic resin body having a foamed core and a continuous surface layer, said method comprising the steps of:
    a. injecting into a mold cavity of given volume an initial quantity of a melt of a first synthetic thermoplastic resin material adapted to form surface portions of said body through a passageway surrounding a tube penetrating into said mold cavity for a distance at least equal to the thickness of said layer, said passageway terminating short of the end of said tube penetrating into said mold; and
    b. thereafter injecting into said mold cavity through said tube a quantity of a melt of a second synthetic thermoplastic resin material containing an expanding agent to spread said first material along the walls of said cavity and concurrently therewith continuing to inject said first material through said passageway in a sheath around said melt of said second material at a rate such that the spreading of said melt of first material by said second material is incapable of interrupting the continuity of the layer of said first material.

* * * * *